United States Patent

[11] 3,556,136

| [72] | Inventor | Kenneth H. White<br>Painted Post, N.Y. |
|---|---|---|
| [21] | Appl. No. | 828,426 |
| [22] | Filed | May 19, 1969<br>Continuation of application Ser. No.<br>644,141, June 7, 1967, now abandoned. |
| [45] | Patented | Jan. 19, 1971 |
| [73] | Assignee | Ingersoll-Rand Company<br>New York, N.Y.<br>a corporation of New Jersey |

[54] FLUID-CONTROL VALVE
3 Claims, 3 Drawing Figs.

[52] U.S. Cl. .................................. 137/512.1,
251/368
[51] Int. Cl. .................................. F16k 15/02

[56] References Cited
UNITED STATES PATENTS

| 1,688,185 | 10/1928 | Hazard | 137/512.1 |
| 2,162,832 | 6/1939 | Baumgarten | 137/454.4 |
| 2,306,170 | 12/1942 | Kuttner | 137/454.4 |
| 2,807,511 | 9/1957 | Fleming | 251/368X |
| 3,093,359 | 6/1963 | De Woody | 251/368X |
| 3,177,893 | 4/1965 | King | 137/512.1 |
| 3,358,710 | 12/1967 | Page | 137/512.1 |
| 1,986,810 | 1/1935 | Haight | 137/454.4 |

Primary Examiner—William F. O'Dea
Assistant Examiner—David J. Zobkiw
Attorneys—Carl R. Horten, David W. Tibbott and Bernard J. Murphy ABSTRACT: A channel valve having Teflon inserts on the guides to prevent wear and scoring of the guides and the valve members which move within them.

PATENTED JAN 19 1971
3,556,136
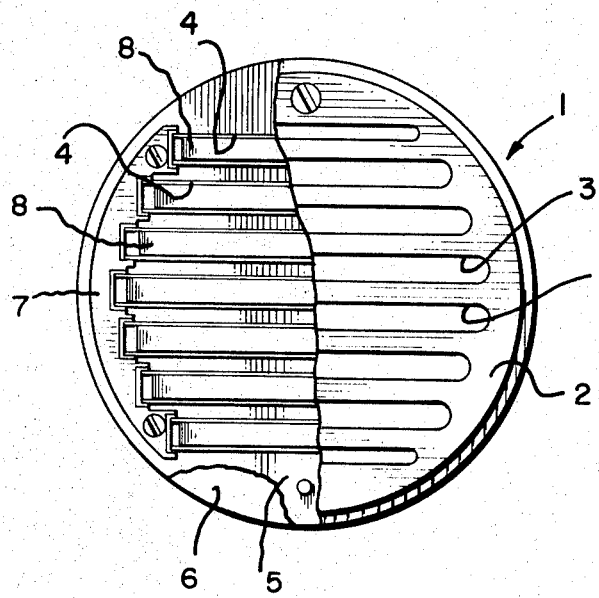
FIG. 1
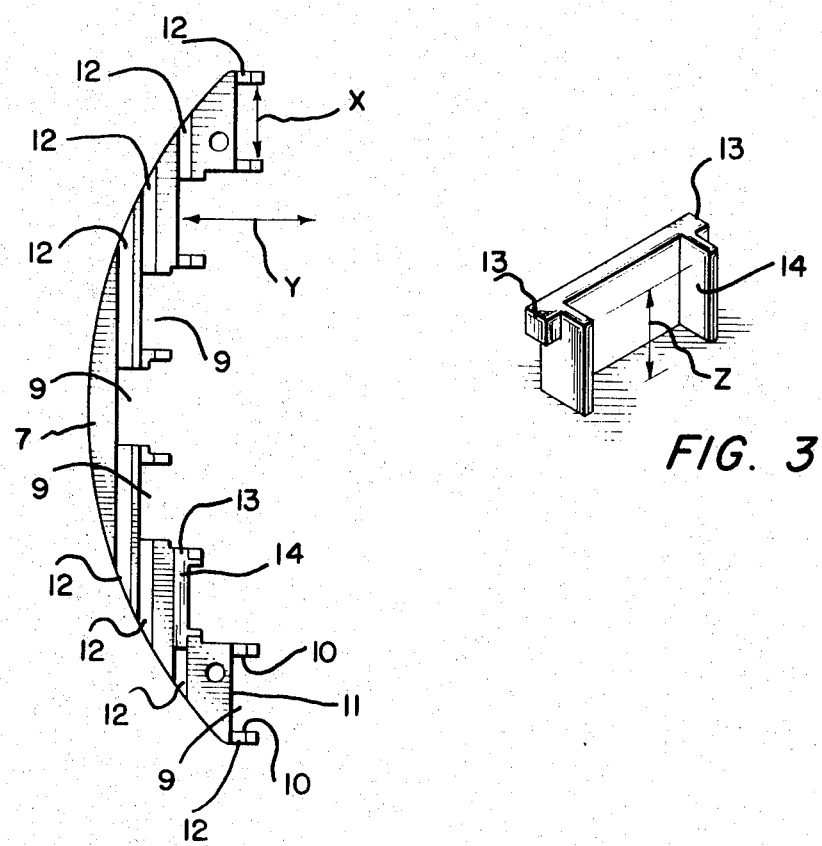
FIG. 2
FIG. 3
INVENTOR.
KENNETH H. WHITE
BY
Bernard J. Murphy
AGENT

FLUID-CONTROL VALVE

This is a continuation of application Ser. No. 644,141, filed Jun. 7, 1967, and now abandoned.

This invention pertains to fluid control valves, and in particular to such valves having displaceable valve members which are limited in the displacement thereof by guide members.

It is well known in the prior art to provide wear plates or inserts between valve members and valve seats to mitigate wear and scoring, and to facilitate maintenance of the valves. This is especially true of valves having valve members which remove from the confined seating area to an expansive area the confines of which are greatly spaced from the valve members. In valves having members displaceable within proximate guides the wear and scoring problem is different. In these valves, the wear and scoring is experienced by the guide surfaces and the valve members, rather than by the valve seat.

Valves employing proximate guides for the valve members exhibit a high mortality due to the scoring and wear of the valve members and the guide through their mutual interaction. Therefore, it is an object of this invention to provide an improved fluid control valve of the type disclosed having means for protecting the valve members and the guide from scoring and wear.

A feature of this invention comprises the use of plastic inserts on the guide to prevent wear and scoring of the guide and the valve members which move within them. Further objects and features of this invention will become more apparent by reference to the following description taken in conjunction with the FIGS. in which:

FIG. 1 is a plan view of a valve according to the invention having the stop plate or cover partially broken away to show the interior structure, and having a fragment of the valve seat cutaway to show the valve body;

FIG. 2 is a plan view of a guide used in the valve of this invention with one of the novel inserts in place; and FIG. 3 is an isometric, isolated view of the novel insert used on the guide of FIG. 2.

As shown in FIG. 1, a ported valve 1, such as a channel valve, is shown having a stop plate or cover 2, with slotted ports 3 formed therein, overlying valve members 4 which remove, under fluid pressure, from the valve seat 5. A valve body 6 mounts the valve seat 5 and a pair of guides 7 (only one of which is shown) at opposite sides. Leaf springs 8 bias the valve members 4 on the valve seat 5. Complementary ports (not shown) are formed in both the valve seat 5 and the valve body 6, to provide fluid communication with ports 3, as is the well-known practice in valves of the channel type.

As shown to better advantage in FIG. 2 the guide 7 is formed with a plurality of troughs 9, and each trough has opposed surfaces 10 and a joining surface 11. Further, across the face of the guide 7 there are formed keyways 12 to receive extending keys 13 of replaceable inserts 14 (only one of which is shown).

In operation the valve members 4 have a primary displacement from and toward the valve seat 5, along a plane of movement Z as represented by the arrow in FIG. 3. By this movement the valve members admit or prohibit flow of fluid through the valve via ports 3 and the porting formed in the valve seat 5 and valve body 6. To facilitate a freely responsive, nonbinding displacement of the valve members 4, it is necessary that the overall dimensions of each valve member 4 be slightly less than the area provided for the displacement thereof between complementary oppositely disposed troughs 9. Therefore, the valve members 4 are given to secondary movements in planes X and Y as represented by the arrows in FIG. 2. Movement in plane X normally precipitates wear and scoring of and by the interfacing valve members 4 and guide 7 in the area of the surfaces 10. Movement of the valve members in the plane Y normally causes wear of said interfacing members along the joining surfaces 11. Accordingly, it is the teaching of this invention to interpose a replaceable plastic insert 14 between the valve members 4 and the surfaces 10 and 11 of the troughs 9 in which they travel. As FIG. 1 clearly evidences stop plate 2 surmounts both the valve members 4 and the guides 7 to restrain the inserts 14 against movement. However, the inserts 14 are readily disengageable and removable from the guides 7 upon removal of the stop plate 2 from the valve seat 5.

The structure illustrated, only by way of example, teaches a preferred embodiment of the invention. Clearly, other embodiments of the teaching of my disclosure will occur to those skilled in the art. For instance, while I represent the inserts 14 as separate, other embodiments can employ serially joined contiguous inserts providing a unitized element for a full guide 7. Also, an end of my invention being the interposition of protecting means between guides 7 and the valve members 4, this can be practiced by disposing a freestanding protecting member therebetween; it can be exemplified further by plastic coating the guide 7, or the valve members 4, or both, to prevent wear and scoring therebetween. Thus, these and further embodiments of my invention can be practiced without departing from the spirit of my disclosure.

While I have described my invention in connection with a specific embodiment, it is to be clearly understood that this is done only by way of example and not as a limitation to the scope of my invention as set forth in the object thereof and in the accompanying claims.

I claim:

1. A ported, fluid control valve of the channel type, having a valve seat; elongated valve members disposed on said valve seat and displaceable for a given distance toward and away from said valve seat for effecting opening and closing of the valve porting; a pair of guide members fixed proximate to terminal ends of each of said valve members for confining said valve members to a given area of displacement; and a stop plate replaceably secured to said valve seat, overlying said guide members and said valve members; the improvement comprising:

inserts interposed between said valve members and said guide members for protecting said valve members and said guide members against wear and scoring;

said inserts being replaceably engaged with said guide members, wherein;

said stop plate restrains said inserts against movement, and holds said inserts in engagement with said guide members;

said inserts being removable from said guide members, upon removal of said stop plate from said valve seat;

said guide members have pilot means for restricting movement of said valve members through X and Y planes of said given area, and for accommodating displacement of said valve members through the Z plane of said given area;

said pilot means comprises troughs formed in said guide members, said troughs each having opposed first and second surfaces joined by a third surface; said opposed first and second surfaces defining the limits of said X plane and said third surface defining a limit of said Y plane; said inserts are in abutting engagement with said first, second, and third surfaces; and wherein said inserts have keying means for effecting engagement with said first, second, and third surfaces; and said first and second surfaces have relieved areas formed therein for receiving said keying means.

2. A fluid-control valve, according to claim 1, wherein: said inserts each have both a configuration and dimensions which, respectively, are in conformity with, and complementary to, the configuration and dimensions of said troughs.

3. A fluid control valve, according to claim 1, wherein: said inserts are formed of stiff plastic.